United States Patent Office 2,756,235
Patented July 24, 1956

2,756,235

METHOD OF PRODUCING LYSERGIC ACID AMIDE

Cameron Ainsworth, Indianapolis, Ind., assignor to Eli Lilly and Company, Indianapolis, Ind., a corporation of Indiana No Drawing. Original application August 27, 1954, Serial No. 452,720. Divided and this application April 1, 1955, Serial No. 498,781

2 Claims. (Cl. 260—285.5)

This invention relates to a novel method of preparing lysergic acid amide. More specifically, it relates to a process of converting lysergic acid hydrazide to lysergic acid amide.

Lysergic acid amide or ergine has long been known. Since the time of its discovery, however, no satisfactory method of synthesizing this substance has been developed.

I have now discovered a process for converting lysergic acid hydrazide, a readily available starting material, directly to lysergic acid amide. My novel method comprises treating a solution of lysergic acid hydrazide with Raney nickel at ordinary pressures. During the course of the conversion, ammonia is liberated. A preferred manner of carrying out my invention is as follows: 1 g. of lysergic acid hydrazide is dissolved in from 100 to 500 ml. of an inert solvent, preferably 95 percent ethanol, and about 15 g. of a heavy suspension of Raney nickel catalyst in ethanol are added thereto. The mixture is then refluxed, with stirring, for about three hours. At this point the catalyst is filtered off, and the filtrate is evaporated to dryness in vacuo. The resulting residue comprising lysergic acid amide is then crystallized from a suitable solvent.

Any solvent which is relatively inert to the action of Raney nickel catalyst, can be used in my process, including alcohols, ethers, hydrocarbons, and the like. I usually employ 95 percent ethanol as a solvent, but other solvents such as methyl cyclohexane, dioxan, and the like are equally operative. Additional suitable solvents will readily be apparent to anyone skilled in the art.

With respect to the hydrogen which cleaves the hydrazide grouping of lysergic acid hydrazide to an amide grouping and ammonia, it is that hydrogen which is present in the Raney nickel catalyst. The hydrogen arises during the process of preparing this catalyst and is adsorbed on the catalyst in the amount of about 0.0025 mol. per gram of catalyst. Illustratively, 15 g. of a heavy suspension of catalyst in ethanol contain about 14 g. of dry Raney nickel catalyst and about 0.035 mol. of hydrogen. The amount of Raney nickel catalyst used in carrying out my process is that amount which will provide at least one molecular equivalent of hydrogen for each molecular equivalent of lysergic acid hydrazide to be reacted. Preferably an excess of catalyst is employed. The amount of excess is not critical and can be from 10 to 500 percent or more.

In carrying out my invention, I prefer to heat the mixture of lysergic acid hydrazide, solvent and Raney nickel catalyst with stirring to the reflux temperature of the solvent for at least two or three hours. If lower temperatures are used, it is desirable to prolong the heating period.

This invention is further illustrated by the following specific example:

Preparation of dl-lysergic acid amide 1 g. of lysergic acid hydrazide (prepared by the method of Stoll et al., United States Patent No. 2,090,429, issued August 17, 1937) was dissolved in 500 ml. of boiling ethanol. 15 g. of a heavy suspension of Raney nickel catalyst were then added. The mixture was heated under reflux with stirring for two hours. The nickel catalyst was removed by filtration, and the filtrate was evaporated to dryness. The residue was treated with 10 ml. of methanol, and a solid mass resulted which was collected by filtration. The filter cake was dissolved in 5 ml. of warm dimethylformamide and 25 ml. of methanol were added. After standing at 5° C. for three days, 0.6 g. of solid crystals which formed, were collected. On heating on a Fisher-Johns melting point block, a sample of these crystals, after drying, melted at 130–135° C. with gas evolution. They resolidified at about 140° C. and then began to darken at about 170° C., totally melting by about 190° C. The compound was dried at 78° C. and 0.5 mm. pressure for four hours and analysed for lysergic acid amide with one mol. of methanol of crystallization.

*Analysis.*—Calc'd for $C_{16}H_{17}N_3O \cdot CH_3OH$: C, 68.20; H, 7.07; N, 14.04. Found: C, 68.30; H, 7.27; N, 14.15.

This application is a division of my prior copending application Serial No. 452,720, filed August 27, 1954, now abandoned.

I claim:

1. The process of preparing a lysergic acid amide from lysergic acid hydrazide which comprises heating lysergic acid hydrazide with an excess of Raney nickel catalyst in a solvent inert to hydrogenation with Raney nickel catalyst.

2. The process according to claim 1 wherein the inert solvent is ethanol.

No references cited.